US012674695B2

(12) United States Patent　　(10) Patent No.:　US 12,674,695 B2
Konishi　　　　　　　　　　　　　(45) Date of Patent:　　　Jul. 7, 2026

(54) ULTRASONIC FLOW METER

(71) Applicant: Panasonic Intellectual Property Management Co., Ltd., Osaka (JP)

(72) Inventor: Ryohei Konishi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 300 days.

(21) Appl. No.: 18/281,658

(22) PCT Filed: Mar. 8, 2022

(86) PCT No.: PCT/JP2022/009910

§ 371 (c)(1),
(2) Date: Sep. 12, 2023

(87) PCT Pub. No.: WO2022/202275

PCT Pub. Date: Sep. 29, 2022

(65) Prior Publication Data

US 2024/0159579 A1　　May 16, 2024

(30) Foreign Application Priority Data

Mar. 25, 2021　　(JP) ................................. 2021-050923

(51) Int. Cl.
G01F 1/66　　(2022.01)
G01F 1/667　　(2022.01)
(52) U.S. Cl.
CPC .............. G01F 1/662 (2013.01); G01F 1/667 (2013.01)
(58) Field of Classification Search
CPC .................................. G01F 1/662; G01F 1/667
(Continued)

(56) References Cited

U.S. PATENT DOCUMENTS

2013/0239699 A1　　9/2013　Ozaki et al.

FOREIGN PATENT DOCUMENTS

JP　　　　9-43015　　　2/1997
JP　　2005-43207　　　2/2005
(Continued)

OTHER PUBLICATIONS

Translation of JP-2019196905-A (Year: 2019).*
International Search Report issued Apr. 12, 2022 in corresponding International Application No. PCT/JP2022/009910.

*Primary Examiner* — Nathaniel T Woodward
(74) *Attorney, Agent, or Firm* — Wenderoth, Lind & Ponack, L.L.P.

(57)　　　　　　　　ABSTRACT

An ultrasonic flow meter includes a cylindrical passage; a pair of ultrasonic transducers; a measuring unit, an arithmetic circuit, and a partition plate. The measuring unit measures a propagation time of ultrasound from one to the other of the ultrasonic transducers. The arithmetic unit operates flow velocity or flow rate of the measurement fluid. The partition plate divides the cylindrical passage into a plurality of divided passages. The cylindrical passage includes a normal propagation route and a shortcut propagation route that makes a shortcut for the normal propagation route through which ultrasound propagates from one of the ultrasonic transducers to the other of the ultrasonic transducers. The partition plate is formed, at a region corresponding to the shortcut propagation route, with a cutaway or opening portion through which the divided passages communicate with each other.

10 Claims, 4 Drawing Sheets

(58) Field of Classification Search
USPC ...................................................... 73/861.27
See application file for complete search history.

(56) References Cited

FOREIGN PATENT DOCUMENTS

| JP | 2012-103149 | | 5/2012 |
|----|-------------|---|--------|
| JP | 2019-196905 | | 11/2019 |
| JP | 2019196905 A | * | 11/2019 |
| JP | 2021-18129 | | 2/2021 |

* cited by examiner

ULTRASONIC FLOW METER

CROSS-REFERENCE TO RELATED APPLICATIONS

The present application is the U.S. National Phase under 35 U.S.C. § 371 of International Application No. PCT/JP2022/009910, filed on Mar. 8, 2022, which claims the benefit of priority of Japanese Patent Application No. 2021-050923, filed on Mar. 25, 2021, the entire contents of which are incorporated herein by reference.

TECHNICAL FIELD

The present disclosure relates to an ultrasonic flow meter for measuring a flow rate in which the passage is divided into multiple layers.

BACKGROUND ART

A conventional ultrasonic flow meter measures, as shown in FIG. 6A and FIG. 6B, a flow rate of the measurement fluid flowing in the passage 105 that is divided into multiple layers by the partition plates 109. This configuration allows the ultrasound transmitted from the ultrasonic transducer 116, to be reflected at the bottom plate 107 of the passage 105, and to be received by the ultrasonic transducer 117 (see Patent Literature 1, for example).

The ultrasonic flow meter recited in Patent Literature 1 has a shortcut route R along which the ultrasound propagates to the other ultrasonic transducer without being reflected at the bottom plate 107, unlike the normal propagation routes 124, 125.

CITATION LIST

Patent Literature

Patent Literature 1: JP-2012-103149 A

SUMMARY OF INVENTION

In the conventional configuration having the V-shape, the ultrasound can travel along the normal propagation routes 124, 125, in which the ultrasound is transmitted from the ultrasonic transducer 116, is reflected at the bottom plate 107 of the passage 105, and is received by the ultrasonic transducer 117. In the conventional configuration, the ultrasound also can travel along the shortcut route R, in which the ultrasound reaches the ultrasonic transducer 117 without reflection. In the conventional configuration therefore, diffracted wave signals passing the shortcut route R could interfere with and affect the normal received signals traveling through the normal propagation routes 124, 125.

If the measurement fluid is hydrogen, in which the sonic speeds of ultrasound tend to be higher and the ultrasound tends to have a longer wavelength compared to the air, town gas or LP gas, diffraction is likely to occur compared to the air, town gas or LP gas. Accordingly, the interference of the diffracted wave signals could affect the normal received signals, thus decreasing accuracy in the flow rate measurement.

In FIG. 6A, the shortcut route R is indicated by a dotted line for explanation, the actual shortcut route corresponds to the whole region of a triangle surrounded by the normal propagation routes 124, 125 and the inner wall surface 105a of the passage 105.

The present disclosure provides, in a case where a shortcut route exists for the normal propagation route, an ultrasonic flow meter that can minimize bad effects of the interference of the diffracted wave signals traveling along the shortcut route on the normal received signals traveling through the normal route.

An ultrasonic flow meter according to the present disclosure includes a cylindrical passage having a rectangular cross section through which a measurement fluid flows; a pair of ultrasonic transducers respectively located in an upstream portion and in a downstream portion of the cylindrical passage; a measuring unit, an arithmetic circuit, and a partition plate. The measuring unit measures a propagation time of ultrasound from one of the ultrasonic transducers to the other of the ultrasonic transducers. The arithmetic unit operates, based on the propagation time measured by the measuring unit, flow velocity or flow rate of the measurement fluid. The partition plate is disposed in the cylindrical passage so as to be in parallel with a flow direction of the measurement fluid. The partition plate divides the cylindrical passage into a plurality of divided passages. The cylindrical passage includes a normal propagation route and a shortcut propagation route that makes a shortcut for the normal propagation route through which the ultrasound propagates from one of the ultrasonic transducers to the other of the ultrasonic transducers. The partition plate is formed, at a region corresponding to the shortcut propagation route with a cutaway or opening portion through which the divided passages communicate with each other.

In the ultrasonic flow meter of the present disclosure, at a region corresponding to the shortcut route for the normal propagation route of the ultrasound, the partition plate is formed with the cutaway or opening portion that connects the divided passages. This enables the bad effects to be minimized, which may be caused by the interference of the diffracted wave signals making a shortcut for the normal propagation route, on the normal received signals traveling through the normal propagation route. It is therefore possible to implement the ultrasonic flow meter having a high accuracy even in a hydrogen environment where sonic speeds of the ultrasound tend to be higher and the ultrasound tends to have a longer wavelength.

DESCRIPTION OF EMBODIMENTS

Figure 1:
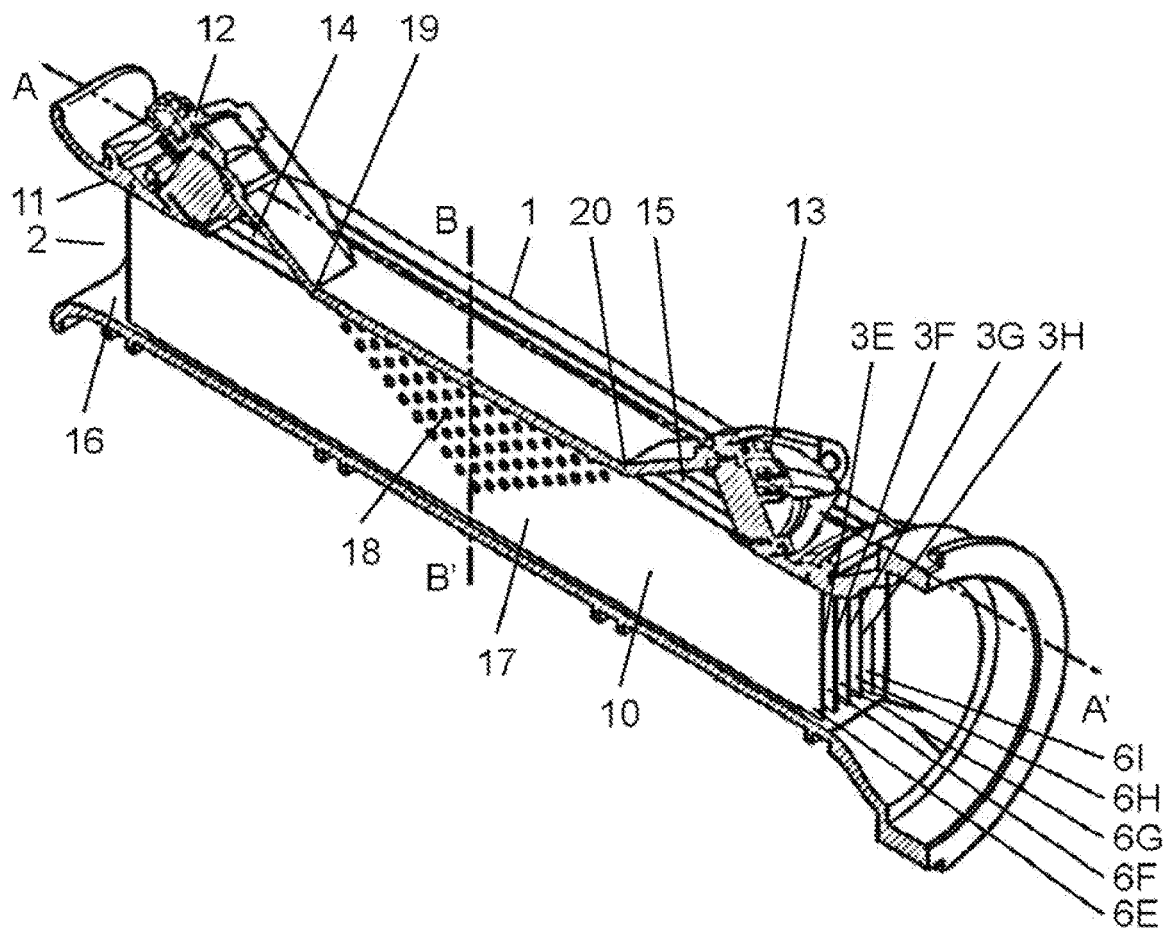
FIG. 1 is a cross-sectional perspective view illustrating a passage portion of an ultrasonic flow meter according to the first embodiment of the present disclosure.

An ultrasonic flow meter according to a first aspect includes a cylindrical passage having a rectangular cross section through which a measurement fluid flows; a pair of ultrasonic transducers respectively located in an upstream portion and in a downstream portion of the cylindrical passage; a measuring unit, an arithmetic unit, and a partition plate. The measuring unit measures a propagation time of ultrasound from one of the ultrasonic transducers to the other of the ultrasonic transducers. The arithmetic unit operates, based on the propagation time measured by the measuring unit, flow velocity or flow rate of the measurement fluid. The partition plate is disposed in the cylindrical passage so as to be in parallel with a flow direction of the measurement fluid. The partition plate divides the cylindrical passage into a plurality of divided passages. The cylindrical passage includes a normal propagation route and a shortcut propagation route that makes a shortcut for the normal propagation route through which ultrasound propagates from one of the ultrasonic transducers to the other of the ultrasonic transducers. The partition plate is formed, at a region corresponding to the shortcut propagation route, with a cutaway or opening portion through which the divided passages communicates with each other. This enables minimizing bad effects of the interference by the diffracted wave signals traveling through the shortcut route on the normal received signals traveling along the normal propagation route. Therefore, a ultrasonic flow meter may be implemented that has a high accuracy even in a hydrogen environment where the sonic speeds of ultrasound tend to be higher and the ultrasound tends to have a longer wavelength.

In the ultrasonic flow meter of a second aspect, which may be implemented in conjunction with in the first aspect, the opening portion is formed such that the partition plate has an opening area ratio of 20% or more at the region corresponding to the shortcut propagation route. This enables reducing the ratio of the diffraction-reflection signals reflected by the partition plates and reaches the receptive ultrasonic transducer among the diffracted wave signals, thus to minimize the amplitude of the diffracted wave signals which might otherwise interfere with and affect the normal received waveform. Therefore, a ultrasonic flow meter may be implemented that has a high accuracy even in a hydrogen environment where the sonic speeds of the ultrasound tend to be higher and the ultrasound tend to have a longer wavelength.

In the ultrasonic flow meter according to the third aspect, which may be implemented in conjunction with the first or the second aspect, the opening portion includes a plurality of openings. This enables suppressing the attenuation of the received signals due to the reflection or diffusion of the ultrasound propagation. In addition, distribution of the opening portion enables a disturbance of a flow of the measurement fluid to be dispersed, thus stabilizing the flows in the divided passages. As a result, a highly accurate flow rate measurement may be implemented.

In the ultrasonic flow meter of the fourth aspect, which may be implemented in conjunction with the first or the second aspect, the opening portion is configured as a porous body having many minute holes or a mesh body. This enables minute shapes of the openings to be set, thus suppressing the attenuation of the ultrasound and stabilizing a flow of the measurement fluid.

In the ultrasonic flow meter of a fifth aspect, which may be implemented in conjunction with any one of the first to fourth aspects, the partition plate includes a plurality of partition plates. At least one of the pluralities of partition plates includes the opening portion having a shape different from that of another partition plate, or the ultrasonic flow meter further comprising a partition plate that includes no opening. This enables minimizing the influence of a disturbance of a flow of the measurement fluid due to the opening portion, thus suppressing the attenuation of the ultrasound and stabilizing a flow of the measurement fluid.

Embodiments will be described in detail with reference to drawings. However, unnecessary description may be omitted. For example, detailed description of well-known matters or the redundant description of substantially the same configuration may be omitted.

Note that the attached drawings and the following description are provided for a person skilled in the art to fully understand the present disclosure, and are not intended for limiting the subject matter in the attached claims.

First Embodiment

First Embodiment will be described with reference to FIGS. 1-4B.

Figure 2:
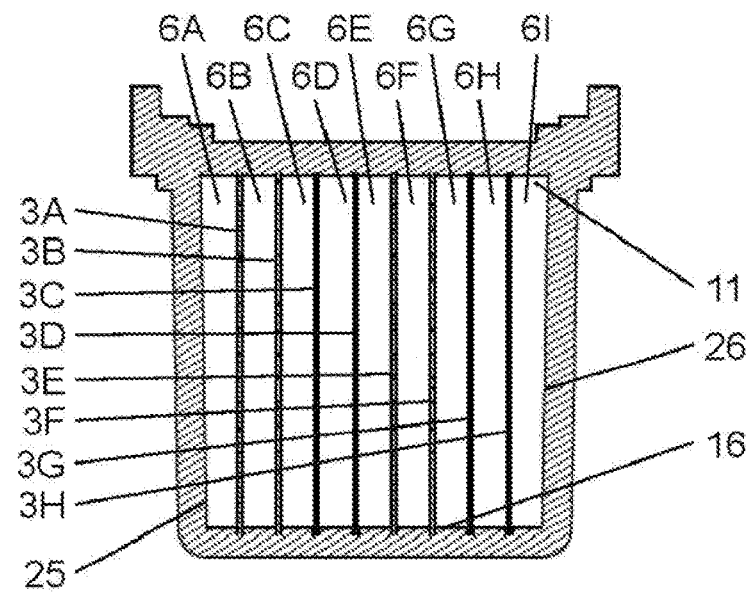
FIG. 2 is a side view illustrating the passage portion of the ultrasonic flow meter according to the first embodiment of the present disclosure.
Figure 3:
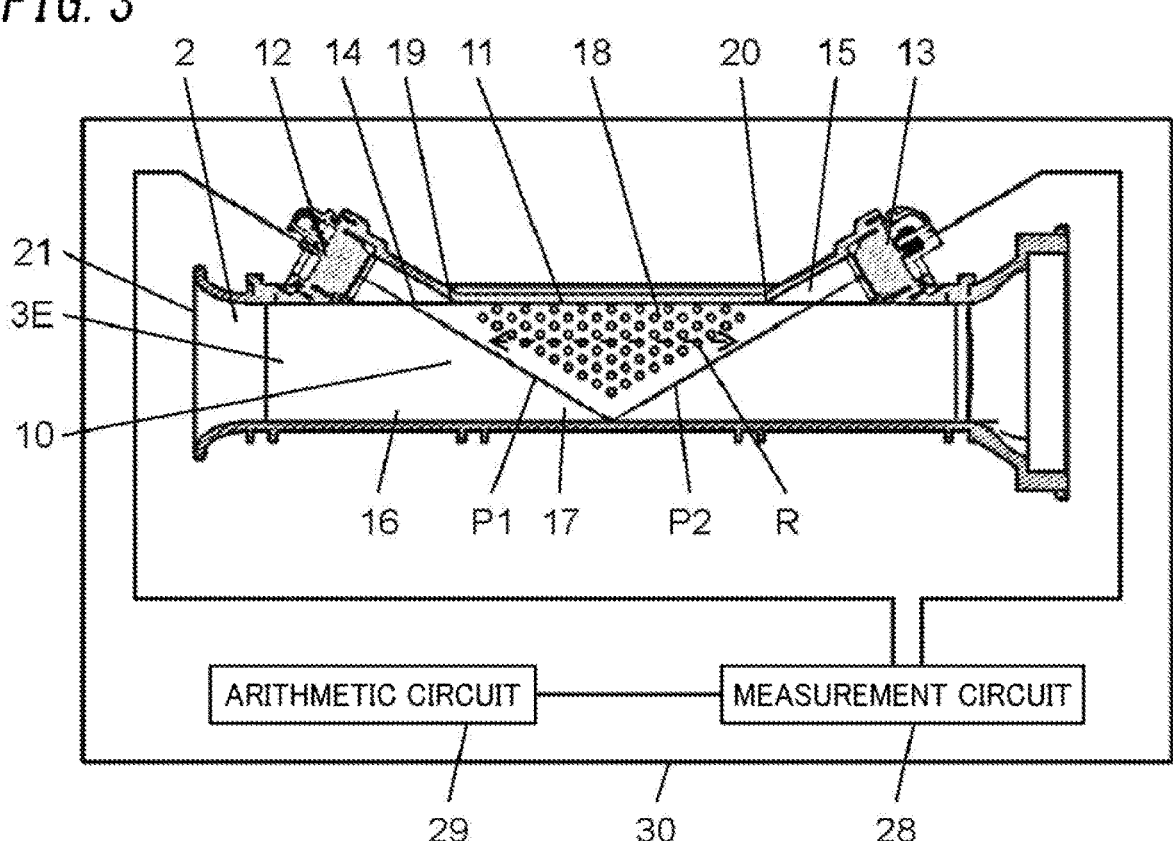
FIG. 3 is a cross-sectional view illustrating the configuration of the ultrasonic flow meter according to the first embodiment of the present disclosure.

FIG. 1 is a cross-sectional perspective view illustrating a schematical configuration of an ultrasonic flow meter according to the first embodiment of the present disclosure. FIG. 2 is a cross sectional view of a passage portion cut along B-B line in FIG. 1. FIG. 3 is a view illustrating the configuration of an ultrasonic flow meter 30 along with a cross-sectional view cut along A-A line in FIG. 1. Note that a measurement circuit (measurement unit) 28 and an arithmetic circuit (arithmetic unit) 29 are installed on a circuit board (not shown), but they are taken out as shown in FIG. 3 for the sake of illustration.

As shown in FIG. 1, FIG. 2 and FIG. 3, the ultrasonic flow meter includes a measurement passage 17, ultrasonic transducers 12, 13, the measurement unit 28, the arithmetic unit 29, and partition plates 3A-3H.

A passage portion 1 includes a cylindrical passage 2 having a rectangular cross section through which a measurement fluid flows. The cylindrical passage 2 is defined by a first surface 11, a second surface 16, a first side surface 25, and a second side surface 26, all of which surrounding the cylindrical passage 2. The inside of the cylindrical passage 2 is divided into divided passages 6A-6I, each of which having a rectangular cross section, by the partition plates 3A-3H disposed so as to be parallel with a flow direction the measurement fluid, forming multilayered passage 10 as a whole. In other words, the partition plates 3A-3H are configured in the cylindrical passage 2 so as to be parallel with a flow direction of the measurement fluid, thus dividing the cylindrical passage 2 into the multiple divided passages 6A-6I.

FIG. 1 is a cross section cut at a position of the divided passage 6E in FIG. 2. Note that in the divided passages 6E, a surface in the foreground of FIG. 1 (the first side surface 25 in FIG. 2), which faces the partition plates 3A-3D and forms the cylindrical passage 2, is not illustrated.

The first surface 11, an upper surface, is one of two surfaces facing each other and facing the divided passages 6A-6I of the cylindrical passage 2. The ultrasonic transducer 12 and the ultrasonic transducer 13 are disposed in an upstream portion and a downstream portion of the first surface 11, respectively. In other words, a pair of ultrasonic transducers 12, 13 are located in an upstream portion and a downstream portion of the cylindrical passage 2, respectively. The first surface 11 includes a first ultrasound passing window 14 and a second ultrasound passing window 15. The second surface 16, a lower surface, is one of the two surfaces facing each other and facing the divided passages 6A-6I. The second surface 16 functions as a reflective surface for the ultrasound.

The pair of ultrasonic transducers 12, 13 and the multi-layered passage 10 define the measurement passage 17 through which the ultrasound propagates. The ultrasound transmitted from the ultrasonic transducer 12 travels along the propagation route P1, is reflected by the second surface 16, travels along the propagation route P2, and is received by the ultrasonic transducer 13. The ultrasound transmitted from the ultrasonic transducer 13 travels along the propagation route P2, is reflected by the second surface 16, travels along the propagation route P1, and is received by the ultrasonic transducer 12.

Each of the partition plates 3A-3H is formed with an opening portion 18 at a region (a triangle region surrounded by the propagation routes P1, P2 and the first surface 11) that makes a shortcut for the propagation routes P1, P2 (refer to FIG. 3) of the ultrasound as shown in FIG. 3. Through the opening portion 18, the adjacent divided passages communicate with each other. Hereinafter, the propagation routes P1, P2 may be referred to as a "normal propagation route", and the region that makes the shortcut may be referred to as a "shortcut route R." In other words, each of the partition plates 3A-3H is formed with the opening portion 18 that allows the divided passages 6A-6I communicate with each other, at the region corresponding to the shortcut route R that makes a shortcut for the normal propagation routes P1, P2, through which the ultrasound propagates from the ultrasonic transducer 12 to the ultrasonic transducer 13 as a normal route.

The outermost divided passage 6A and divided passage 6I are referred to as "outer passages." The inner divided passages 6B-6H are referred to as "inner passages."

As described above, arrows indicated by the normal propagation routes P1, P2 correspond to the propagation route along which the ultrasound propagates so as to traverse the measurement passage 17. Note that the directions of the arrows indicate the travel of the ultrasound from the upstream ultrasonic transducer 12 to the downstream ultrasonic transducer 13. The arrows direction will be opposite when the ultrasound travels from the downstream ultrasonic transducer 13 to the upstream ultrasonic transducer 12.

The signals transmitted from the first ultrasonic transducer 12 or the second ultrasonic transducer 13 are processed for propagation time measurement by the measurement circuit 28 (measurement unit), and flow velocity or flow rate of the measurement fluid is calculated with a known method by the arithmetic circuit 29 (arithmetic unit).

Figure 4A:
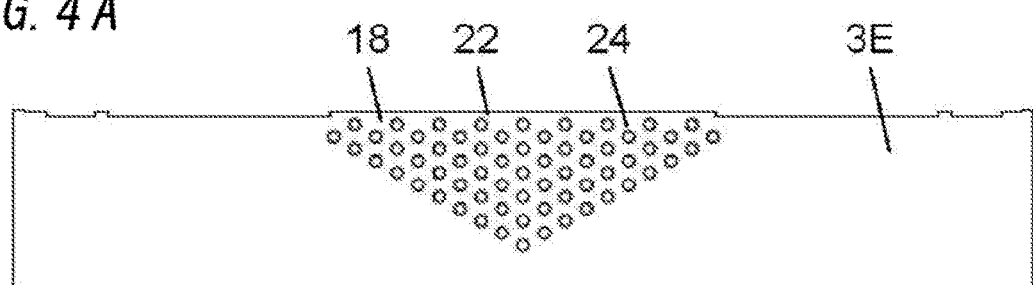
FIG. 4A is a detailed view illustrating an opening portion according to the first embodiment of the present disclosure.
Figure 4B:
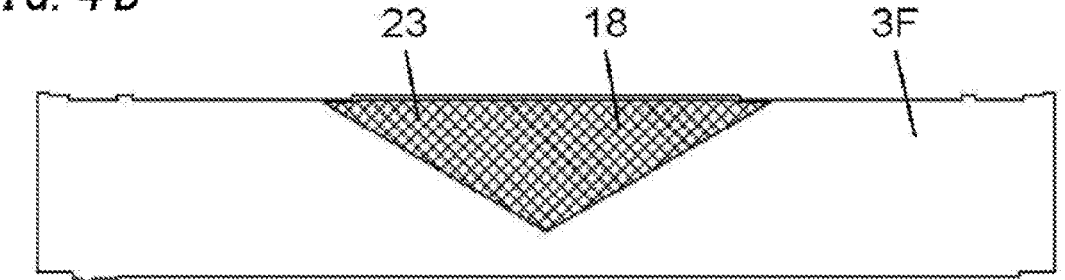
FIG. 4B is a detailed view illustrating an opening portion according to the first embodiment of the present disclosure.

FIG. 4A and FIG. 4B illustrate details of the opening portions 18 formed in the partition plates 3A-3H. The opening portions 18 are formed in the partition plates 3A-3H in parts corresponding to the shortcut route R for the normal propagation routes P1, P2 of the ultrasound. The part corresponding to the shortcut route R is a region surrounded by the normal propagation routes P1, P2, and the first surface 11.

FIG. 4A is a detailed view illustrating the second partition plate 3E. FIG. 4A illustrates one example of the shape of the opening portion 18. The opening portion 18 is made of a porous body 22 having many minute holes 24. Note that hole diameters and intervals between the minute holes 24 are adjusted such that necessary rectifying effects may be maintained. The porous body 22 may include a punching plate in which many holes are mechanically formed, or an etching plate in which minute holes are chemically formed, which may provide a higher manufacturability.

FIG. 4B illustrates another example of shape of the opening portion 18. The opening portion 18 is made of a mesh body 23 made of a metallic mesh. Mesh number and opening area ratio of the mesh body 23 should be set in such a range that necessary rectifying effects may be maintained.

Next, the operation of the ultrasonic flow meter 30 according to the present disclosure will be described.

As shown in FIG. 3, the measurement fluid flows into the cylindrical passage 2 through an inlet 21, and is divided by the partition plates 3A-3H into the divided passages 6A-6I.

The propagation time of the ultrasound is measured in such a way that the ultrasound is repeatedly transmit and received between the ultrasonic transducer 12 and the ultrasonic transducer 13 so that the ultrasound is reflected at the second surface 16 to traverse the flow of the measurement fluid through the measurement passage 17 in the divided passages 6A-6I.

The ultrasound transmitted from the ultrasonic transducer 12 (or the ultrasonic transducer 13) travels through the ultrasound passing window 14 (or the ultrasound passing window 15), enters the divided passages 6A-6I, and then is reflected by the second surface 16. Then, the ultrasonic signals reflected by the second surface 16 travels through the ultrasound passing window 15 (or the ultrasound passing window 14), and is received by the ultrasonic transducer 13 (or the ultrasonic transducer 12). During the propagation, the ultrasonic signals repeat multiple reflections at the partition plates 3A-3H, the first side surface 25, and the second side surface 26.

The diffracted wave signals traveling the shortcut route R that makes a shortcut for the normal propagation routes P1, P2 has a lower ratio of the reflection at the partition plates 3A-3H, the first side surface 25, the second side surface 26 as reflective surfaces, compared to the normal received signals that travel through the normal propagation routes P1, P2, since the partition plates 3A-3H are provided with the opening portions 18. This enables reducing the amplitude of the diffracted wave signals due to multiple reflections at the reflective surfaces. This further enables minimizing bad effects of the interference of the diffracted wave signals traveling along the shortcut route R on the normal received signals traveling along the normal propagation routes P1, P2, thus improving measurement accuracy.

If, in the propagation route area of the ultrasound, the whole area of the wall surface of the partition plates 3A-3H were open, the effect of straightening a flow of the measurement fluid would be reduced, even though the multiple reflections of the ultrasound would never occur. The reduction in the effect would cause differences or fluctuations in the flow velocity distribution among the divided passages 6A-6I, thus decreasing measurement accuracy or measurable regions.

In this embodiment, the opening portions 18 are provided in a range of the partition plates 3A-3H surrounded by the normal propagation routes P1, P2 and the first surface 11, to maintain the effect of straightening a flow of the measurement fluid. This enables the diffracted wave signals to be reduced and the effect of straightening a flow of the measurement fluid to be maintained. More specifically, this enables the diffracted wave signals in ultrasound propagation to be reduced, and a disturbance of a flow of the measurement fluid to be dispersed by the dispersion of the openings in the opening portion 18, thus stabilizing the flow in the divided passages 6A-6I. As a result, an accurate flow rate measurement may be implemented.

The opening area ratio of the opening portion 18 at the region of the shortcut route R may be between 20% and 85% inclusive. If the aforementioned condition is satisfied, the bad influence of the diffracted wave signals that travel through the shortcut route R on the normal received signals that travels through the normal propagation routes P1, P2 may be reduced.

Second Embodiment

Next, a second embodiment according to the present disclosure will be described with reference to FIG. 5A, FIG. 5B and FIG. 5C.

Figure 5A:
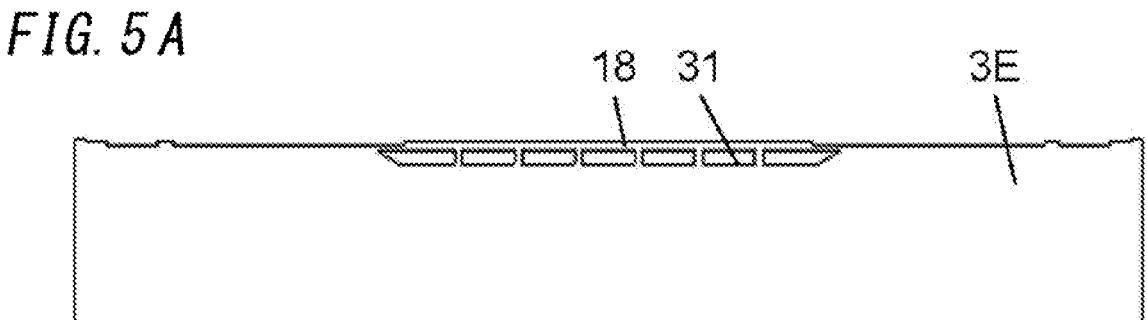
FIG. 5A is a detailed view illustrating another configuration of an opening portion according to the second embodiment of the present disclosure.

FIG. 5A illustrates another configuration of the opening portion 18 in the second embodiment according to the present disclosure, in which any constituent member of this embodiment having the same function as the counterpart of the first embodiment described above will be designated by the same reference signs as that counterpart's.

In the second embodiment, a plurality of opening 31 are provided as the opening portion 18 only near the first surface 11 in a part corresponding to the shortcut route R, which is the shortest shortcut between the ultrasonic transducer 12 and the ultrasonic transducer 13.

The ultrasonic signal transmitted from the ultrasonic transducer 12 (or the ultrasonic transducer 13) travels through the ultrasound passing window 14 (or the ultrasound passing window 15), enters the divided passages 6A-6I, and then is reflected by the second surface 16. Then, the ultrasonic signals reflected by the second surface 16 travels through the ultrasound passing window 15 (or the ultrasound passing window 14), and is received by the ultrasonic transducer 13 (or the ultrasonic transducer 12). During the propagation, the ultrasonic signals repeat multiple reflections at the partition plates 3A-3H, the first side surface 25, and the second side surface 26.

Incidentally, the diffracted wave signals received by the ultrasonic transducer 13 (or the ultrasonic transducer 12) include the following ones. That is, part of the ultrasound that is transmitted from the ultrasonic transducer 12 (or the ultrasonic transducer 13) and then travels through the ultrasound passing window 14 (or the ultrasound passing window 15) is diffracted at the end portion 19 of the ultrasound passing window 14 (or the end portion 20 of the ultrasound passing window 15). Then, the diffracted part of the ultrasound travels along the shortest route part, is diffracted again at the end portion 20 of the ultrasound passing window 15 (or the end portion 19 of the ultrasound passing window 14), and is received by the ultrasonic transducer 13 (or the ultrasonic transducer 12). During the propagation, the diffracted wave signals repeat multiple reflections at the partition plates 3A-3H, the first side surface 25, and the second side surface 26.

In the embodiment, the opening portion 18 in the shortcut route R reduces an area as a reflective surface for collision, thus reducing the diffracted wave signals due to multiple reflections. In this embodiment, the opening portion 18 is provided only a portion near a region between the end portion 19 of the ultrasound passing window 14 and the end portion 20 of the ultrasound passing window 15 in the partition plates 3A-3H, i.e., the shortest route part of the shortcut route R, so that the diffracted wave signals may be reduced. In addition, since the opening area ratio of the partition plates 3A-3H relative to the whole wall surface is small, deterioration of the effect of straightening a flow of the measurement fluid may be suppressed, so that an accurate flow rate measurement may be implemented.

Figure 5B:
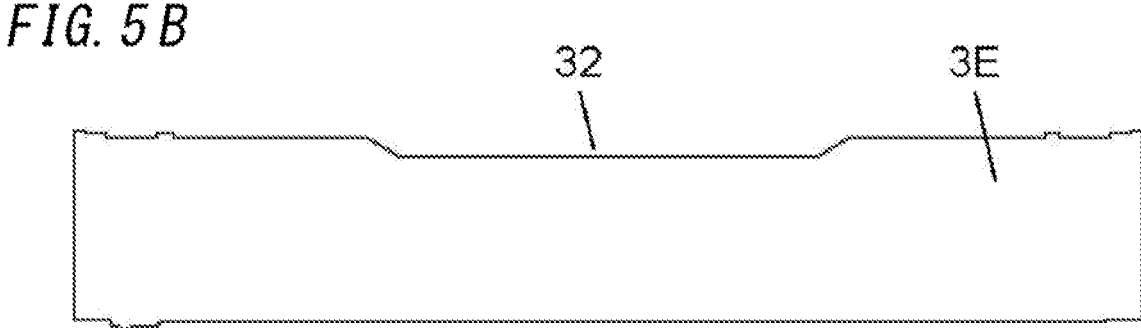
FIG. 5B is a detailed view illustrating other configuration of the opening portion according to the second embodiment of the present disclosure.

FIG. 5B illustrates an example of another configuration of the partition plates 3A-3H, in which the opening portion 18 shown in FIG. 5A is enlarged toward the first surface 11 to form a cutaway portion 32 that is a single concave facing the first surface 11. This shape simplifies the shape and improves processability of the partition plate 3E, while providing the effect of reducing the diffracted wave signals.

Figure 5C:
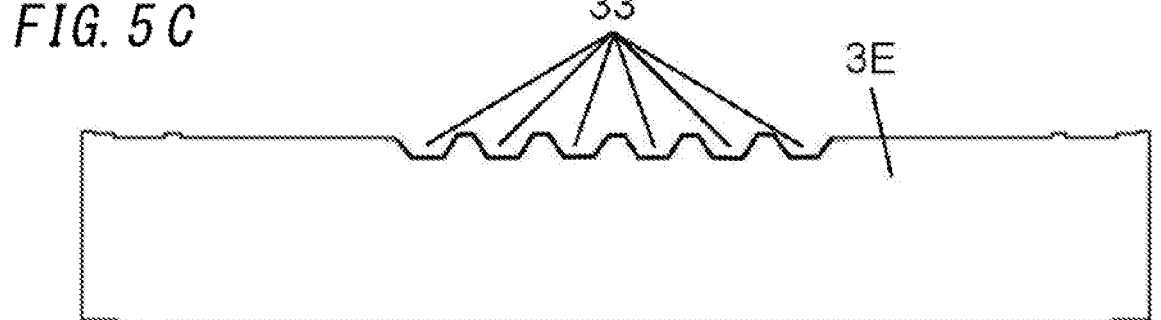
FIG. 5C is a detailed view illustrating still other configuration of the opening portion according to the second embodiment of the present disclosure.
Figure 6A:
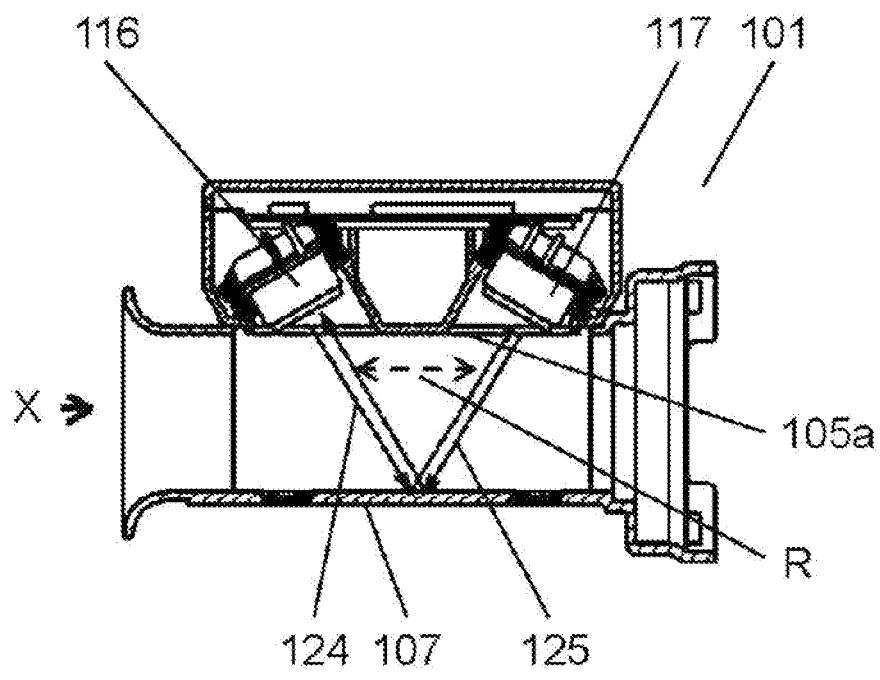
FIG. 6A is a cross-sectional view illustrating the configuration of a conventional ultrasonic flow meter.
Figure 6B:
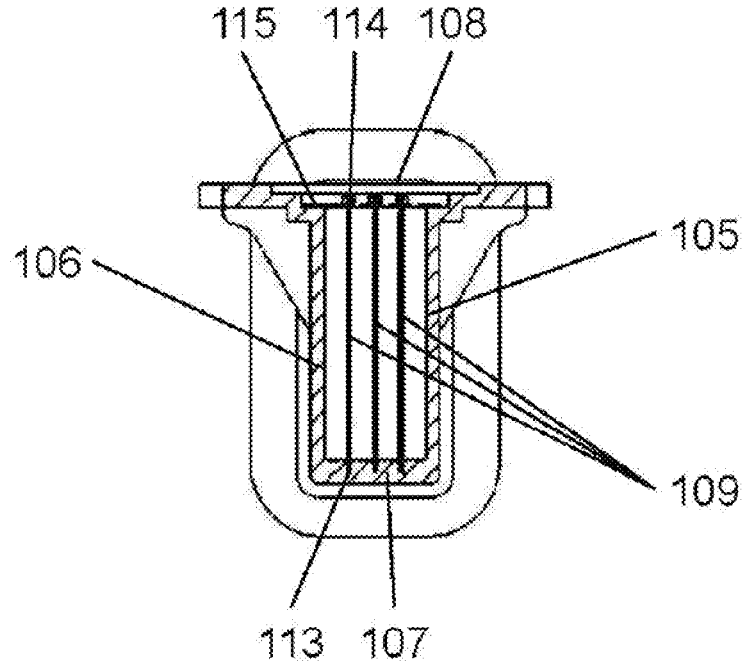
FIG. 6B is a side view illustrating the configuration of the conventional ultrasonic flow meter.

As shown in FIG. 5C, the partition plate 3E may be formed with a plurality of cutaway portions 33. In that case, as in FIG. 5B, the diffracted wave signals may be reduced.

As shown in the first embodiment and the second embodiment, the partition plates 3A-3H are formed with the opening portion 18 at the region corresponding to the shortcut routes R, which make a shortcut for the normal propagation routes P1, P2 of the ultrasound. The opening portion 18 has the configuration described above. In addition, the first surface 11, one surface of two surfaces facing each other of the measurement passage 17, is provided with the first ultrasonic transducer 12 and the second ultrasonic transducer 13. The ultrasound is transmitted from one of the first ultrasonic transducer 12 and the second ultrasonic transducer 13, and is reflected once or more at the second surface 16, which faces the first surface 11, and is received by the other ultrasonic transducer. This configuration enables minimizing the bad effects of the interference of the diffracted wave signals that makes a shortcut for the normal propagation route on the normal received signals traveling along the normal propagation route, thus to implement an ultrasonic flow meter having a high accuracy even in a hydrogen environment where the sonic speeds of the ultrasound tend to be higher and the ultrasound tends to have a longer wavelength.

As described above, according to the embodiments of the present disclosure, the pair of ultrasonic transducers 12, 13 are configured such that the ultrasound propagation routes are V-shaped, i.e., the ultrasound is reflected at the second surface 16 once. However, the present disclosure is not limited to the aforementioned one. Another configuration may be possible as long as the configuration includes a shortcut route R for a normal propagation route and the normal propagation route P1, P2 in which the ultrasound is reflected at the second surface at least once, such as a W-shaped ultrasound propagation route (not shown) where the ultrasound is reflected at the second surface 16 twice and is reflected at the first surface 11 once In the embodiments, all layers of the multilayered passage 10 are used for the measurement passage 17. However, for a measurement passage having a large size, only one layer in the multilayered passage 10 may be used, or the propagation surface of the ultrasound may overlap multiple layers. In those case, the same effects may be obtained.

In FIG. 1, all of the partition plates 3A-3H are provided with the opening portions. However, the opening portion may be provided in the minimum number of the partition plates 3A-3H, if the diffracted wave signals that make a shortcut for the normal propagation routes P1, P2 has a small influence on the flow rate measurement accuracy so that the flow rate measurement accuracy may be ensured. The shape of the openings formed in the opening portion 18 is not limited to ones described in the embodiments if the aforementioned conditions are satisfied.

INDUSTRIAL APPLICABILITY

Ultrasound flow meters according to the present disclosure can be applicable to gas meters or measurement devices for hydrogen.

REFERENCE SIGNS LIST 3A-3H partition plate
6A-6I divided passage
10 multilayered passage
11 first surface
12, 13, 116, 117 ultrasonic transducer
16 second surface
17 measurement passage
18 opening portion
22 porous body
23 mesh body
24 minute hole
28 measurement circuit (measurement unit)
29 arithmetic circuit (arithmetic unit)
30 ultrasonic flow meter
31 opening
32, 33 cutaway portion

The invention claimed is:

1. An ultrasonic flow meter comprising:
   a cylindrical passage having a rectangular cross section through which a measurement fluid flows;
   a pair of ultrasonic transducers respectively located in an upstream portion and in a downstream portion of the cylindrical passage;
   a measuring unit configured to measure a propagation time of ultrasound from one of the ultrasonic transducers to the other of the ultrasonic transducers;
   an arithmetic unit configured to determine, based on the propagation time measured by the measuring unit, flow velocity or flow rate of the measurement fluid; and
   a partition plate disposed in the cylindrical passage so as to be in parallel with a flow direction of the measurement fluid, the partition plate dividing the cylindrical passage into a plurality of divided passages,
   the pair of ultrasonic transducers being located in a first surface of the cylindrical passage,
   the ultrasound transmitted from one of the ultrasonic transducers traveling along a first propagation route, being reflected by a second surface facing the first surface, traveling along a second propagation route, and being received by the other of the ultrasonic transducers,
   the ultrasound transmitted from the other of the ultrasonic transducers traveling along the second propagation route, being reflected by the second surface, traveling along the first propagation route, and being received by the one of the ultrasonic transducers,
   the cylindrical passage including
      a normal propagation route that includes the first propagation route and the second propagation route, and
      a shortcut propagation route that makes a shortcut for the normal propagation route through which ultrasound propagates from one of the ultrasonic transducers to the other of the ultrasonic transducers, the shortcut propagation route being surrounded by the first propagation route, the second propagation route and the first surface, and
   the partition plate being
      formed, at a first region corresponding to the shortcut propagation route, with a cutaway or opening portion through which the divided passages communicate with each other, and
      formed, at a second region different from the first region, with no cutaway or opening portion through which the divided passages communicate with each other.

2. The ultrasonic flow meter of claim 1, wherein the opening portion is formed such that the partition plate has an opening area ratio of 20% or more at the region corresponding to the shortcut propagation route.

3. The ultrasonic flow meter of claim 2, wherein the opening portion includes a plurality of openings.

4. The ultrasonic flow meter of claim 2, wherein the opening portion is configured as a porous body having many minute holes or a mesh body.

5. The ultrasonic flow meter of claim 2, wherein
   the partition plate includes a plurality of partition plates, and
   at least one of the plurality of partition plates includes the opening portion having a shape different from that of another partition plate, or the ultrasonic flow meter further comprising a partition plate that includes no opening portion.

6. The ultrasonic flow meter of claim 1, wherein the opening portion includes a plurality of openings.

7. The ultrasonic flow meter of claim 6, wherein
   the partition plate includes a plurality of partition plates, and
   at least one of the plurality of partition plates includes the opening portion having a shape different from that of another partition plate, or the ultrasonic flow meter further comprising a partition plate that includes no opening portion.

8. The ultrasonic flow meter of claim 1, wherein the opening portion is configured as a porous body having many minute holes or a mesh body.

9. The ultrasonic flow meter of claim 8, wherein
   the partition plate includes a plurality of partition plates, and
   at least one of the plurality of partition plates includes the opening portion having a shape different from that of another partition plate, or the ultrasonic flow meter further comprising a partition plate that includes no opening portion.

10. The ultrasonic flow meter of claim 1, wherein
   the partition plate includes a plurality of partition plates, and
   at least one of the plurality of partition plates includes the opening portion having a shape different from that of another partition plate, or the ultrasonic flow meter further comprising a partition plate that includes no opening portion.

* * * * *